United States Patent
Wang

(10) Patent No.: US 9,360,037 B2
(45) Date of Patent: *Jun. 7, 2016

(54) WRENCH QUICK RELEASE APPARATUS

(71) Applicant: DTECH PRECISION INDUSTRIES CO., LTD., New Taipei (TW)

(72) Inventor: Ting-Jui Wang, New Taipei (TW)

(73) Assignee: DTECH PRECISION INDUSTRIES CO., LTD. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,970

(22) Filed: Sep. 24, 2014

(65) Prior Publication Data

US 2015/0010346 A1    Jan. 8, 2015

Related U.S. Application Data

(63) Continuation-in-part of application No. 13/344,127, filed on Jan. 5, 2012.

(30) Foreign Application Priority Data

Sep. 16, 2011   (TW) .............................. 100217362 U

(51) Int. Cl.
*F16B 5/00* (2006.01)
*G06F 1/18* (2006.01)
(Continued)

(52) U.S. Cl.
CPC .............. *F16B 19/109* (2013.01); *F16B 5/0088* (2013.01); *F16B 5/0208* (2013.01);
(Continued)

(58) Field of Classification Search
CPC .... F16B 5/0088; F16B 5/0621; F16B 5/0642; F16B 12/2009; F16B 12/2027; F16B 12/2054; F16B 12/2063; F16B 2005/0671; F16B 19/109; F16B 5/00; G06F 1/184
USPC ........ 403/109.6, 322.1, 322.4, 325–327, 378, 403/380, DIG. 4, 167
See application file for complete search history.

(56) References Cited

U.S. PATENT DOCUMENTS 3,709,088 A * 1/1973 Pitzer .............................. 411/70
4,021,126 A * 5/1977 Deeter et al. ................ 403/322.4
(Continued)

FOREIGN PATENT DOCUMENTS

DE             19601919 A1     7/1997

OTHER PUBLICATIONS

"Column." Dictionary.com. [online], [retrieved on Nov. 4, 2014] Retrieved from the Internet <URL: http://dictionary.reference.com/brows/colum n>.

*Primary Examiner* — Josh Skroupa
(74) *Attorney, Agent, or Firm* — Schmeiser, Olsen & Watts, LLP

(57) ABSTRACT

A wrench quick release apparatus includes a sleeve, a positioning unit, a wrench unit and an elasticity unit. The sleeve includes a channel and an engaging section for engaging to a first plate. The positioning unit inserts in the channel of the sleeve, and includes one end inserted through the first plate and an opposite end protrudes out from the channel of the sleeve. The wrench unit is pivotally connected to the positioning unit and protrudes out from one end of the sleeve. The elasticity unit includes one end pushed against the positioning unit and an opposite end pushed against the sleeve. Accordingly, the wrench quick release apparatus is first engaged to the first plate through the sleeve and then engaged to or disengaged from a second plate.

9 Claims, 19 Drawing Sheets

(51) Int. Cl.
*F16B 19/10* (2006.01)
*F16B 5/06* (2006.01)
*F16B 5/02* (2006.01)
*F16B 17/00* (2006.01)
*F16B 1/00* (2006.01)

(52) U.S. Cl.
CPC ............. *F16B5/0642* (2013.01); *F16B 17/006* (2013.01); *G06F 1/184* (2013.01); *G06F 1/186* (2013.01); *F16B 2001/0035* (2013.01); *Y10T 403/33* (2015.01); *Y10T 403/595* (2015.01)

(56) References Cited

U.S. PATENT DOCUMENTS

| | | | | |
|---|---|---|---|---|
| 4,383,473 | A * | 5/1983 | Kaustrater | 89/40.12 |
| 5,205,101 | A * | 4/1993 | Swan et al. | 52/650.1 |
| 5,526,661 | A * | 6/1996 | Lin | 70/233 |
| 5,865,560 | A * | 2/1999 | Mercat et al. | 403/322.4 |
| 6,260,931 | B1 * | 7/2001 | Stewart | 301/124.2 |
| 7,673,947 | B2 * | 3/2010 | Chang | 301/124.2 |
| 8,056,987 | B2 * | 11/2011 | Cusack | 301/124.2 |
| 8,196,789 | B2 * | 6/2012 | Kraeuter et al. | 224/315 |
| 8,573,878 | B2 * | 11/2013 | Chang | 403/322.4 |

* cited by examiner

WRENCH QUICK RELEASE APPARATUS

CROSS-REFERENCE TO RELATED APPLICATION

This application is a continuation-in-part patent application of U.S. application Ser. No. 13/344,127 filed on Jan. 5, 2012, the entire contents of which are hereby incorporated by reference for which priority is claimed under 35 U.S.C. §120.

FIELD OF TECHNOLOGY

The present invention relates to wrench quick release apparatuses, and more particularly, to a wrench quick release apparatus for quickly assembling a first plate and a second plate.

BACKGROUND

Various approaches for assembling two plate-like objects (e.g., a motherboard and a housing) are available. A common approach is fastening through a screw thread structure which generally comprises a screw, a cap and a sleeve. The screw comprises an end of a larger diameter as a force receiving section provided with a screw groove, and another end comprises a screw rod connected with the force receiving section. The cap is fitted around a hollow cylinder about the force receiving section for encapsulating and protecting the screw. The sleeve is a hollow cylinder for fitting the screw rod of the screw in a. way that the sleeve and the cap are dynamically fitted. Accordingly, with a fastening unit, an end of the sleeve is first engaged to a first object (e.g., a. motherboard), rendering the screw rod of the screw corresponded to a fastening opening of a second object (e.g., a housing), and a rotational force is applied to the screw groove of the force receiving section of the screw with the aid of a tool, so as to fasten the screw rod into the fastening opening of the second object and complete the assembly of the two objects. By contrast, a rotational force applied to the screw groove of the force receiving section of the screw with a tool is also required for disengaging the screw rod from the fastening opening of the second object.

However, as previously described, the above structure that completes fastening by a screw thread requires an additional tool for applying a rotational force to the screw groove of the force receiving section of the screw for engagement or disengagement, which means that corresponding engagement and disengagement procedures are more complex and time-consuming. Furthermore, although the prior art provides certain fastening approaches for assembling two objects, these conventional approaches involve fastening operations performed by manual forces that directly press fastening units. Consequently, not only a fastening process of such conventional approach is rather laborious and unpractical, but also utilization inconvenience is resulted due to a lack of force applying section when disengaging the fastening units in reverse.

Accordingly, it is imperative to invent a wrench quick release apparatus for overcoming the drawbacks associated with the prior art.

SUMMARY

In view of the aforesaid drawbacks of the prior art, the inventor of the present invention conceived room for improvement in the prior art and thus conducted extensive researches and experiments according to the inventor's years of experience in the related industry, and finally developed a wrench quick release apparatus for steadily and quickly assembling a first plate and a. second plate with minimal efforts in a convenient manner.

It is an objective of the present invention to provide a wrench quick release apparatus comprising a sleeve, a positioning unit, a wrench unit and an elasticity unit. The wrench quick release apparatus is first engaged to a first plate via the sleeve then engaged to or disengaged from the second plate with the positioning section of the positioning unit through rotations of the wrench unit, so as to quickly and steadily assemble the first plate with the second plate with minimal efforts in a convenient manner.

In order to achieve the above and other objectives, the present invention provides a wrench quick release apparatus for first engaging a first plate and then engaging a second plate to assemble the first plate with the second plate comprises: a sleeve, comprising a first end, a second end opposite to the first end, and a channel in communication with the first end and the second end, the first end comprising an engaging section for engaging the first plate; a positioning unit, being a column body movably inserted in the channel of the sleeve, comprising a positioning end protruding to the first end of the sleeve, a positioning section provided at the positioning end and for engaging with the second plate, and an activating end opposite to the positioning end and protruding out of the second end of the sleeve; a wrench unit, comprising a wrench section and a pushing section connected to the wrench section, the pushing section being a column body and being movably and pivotally connected to the activating end of the positioning unit such that when the wrench unit is substantially rotated by 90 degrees to push the pushing section against the second end of the sleeve, the positioning end and the positioning section of the positioning unit are given impetus for protrusion or retreat; and an elasticity unit, being fitted around the positioning unit, having its one end pushed against the positioning unit and its another end pushed against the sleeve.

Regarding the wrench quick release apparatus in the preferred embodiment, the pushing section has two first contact surfaces and a second contact surface, the second contact surface being connected between the first contact surfaces, the first contact surfaces being two lateral surfaces of the pushing section, respectively, the second contact surface being an end surface of the pushing section, the second contact surface being perpendicular to the first contact surfaces substantially, wherein a vertical distance from a point of pivotal connection of the pushing section and the activating end to the first contact surfaces does not equal a vertical distance from the point of pivotal connection to the second contact surface, wherein the first contact surfaces and the second contact surface are movably pushed against the second end of the sleeve.

Regarding the wrench quick release apparatus in the preferred embodiment, the second contact surface connects to the first contact surfaces by a curved surface, respectively.

Regarding the wrench quick release apparatus in the preferred embodiment, the second contact surface is a curved surface.

Regarding the wrench quick release apparatus in the preferred embodiment, the pushing section of the wrench unit comprises a pivot groove and a pivot inserted through the pivot groove, and the pivot groove is concavely disposed on the first contact surfaces and the second contact surface or concavely disposed on one of the first contact surfaces and the second contact surface, wherein the pivot groove is fitted around the activating end of the positioning unit, and the pivot is inserted through the activating end of the positioning unit.

Regarding the wrench quick release apparatus in the preferred embodiment, the second end of the sleeve has a directional protruding section, such that the activating end of the positioning unit penetrates and exits the directional protruding section, and the pivot groove movably straddles the directional protruding section.

Regarding the wrench quick release apparatus in the preferred embodiment, the positioning section of the positioning unit comprises a positioning column body inserted through the second plate, a threaded column fastened to the second plate, at least two elastic fastening bodies each comprising at its one side a protruding fastening section for fastening to the second plate, or a hook for fastening the second plate.

Regarding the wrench quick release apparatus in the preferred embodiment, the engaging section is a press-in section, a fastening section, a welding section, a flare-in section, an adhering section, a magnetic attraction section, or a snap-engaging section.

Regarding the wrench quick release apparatus in the preferred embodiment, the fastening section comprises a first screw thread at the channel and a fastening element fastened to the first screw thread, and the fastening element comprises a second screw thread matching the first screw thread; the engaging section of the sleeve first accommodates one side of the first plate and the fastening element then fastens another side of the first plate to fasten the second screw thread to the first screw thread.

Regarding the wrench quick release apparatus in the preferred embodiment, the engaging section is integrally formed on the first plate, and the channel is in communication with a first engaging hole of the first plate.

Accordingly, a wrench quick release apparatus of the present invention is characterized in that: an engaging section of a sleeve is riveted, fastened, welded, installed, adhered, magnetically attracted, or snap-engaged to a first engaging hole of a first plate; a. user rotates a wrench unit and thus drives a positioning unit, such that a positioning section of the positioning unit penetrates a. first engaging hole of a. first plate and gets coupled to a second engaging hole of a second plate, so as to effectuate quick assembly of two objects and firm snap-engagement of the two objects in a labor-saving and convenient manner.

BRIEF DESCRIPTION

Objectives, features, and advantages of the present invention are hereunder illustrated with specific embodiments in conjunction with the accompanying drawings, in which.

DETAILED DESCRIPTION

Figure 1:
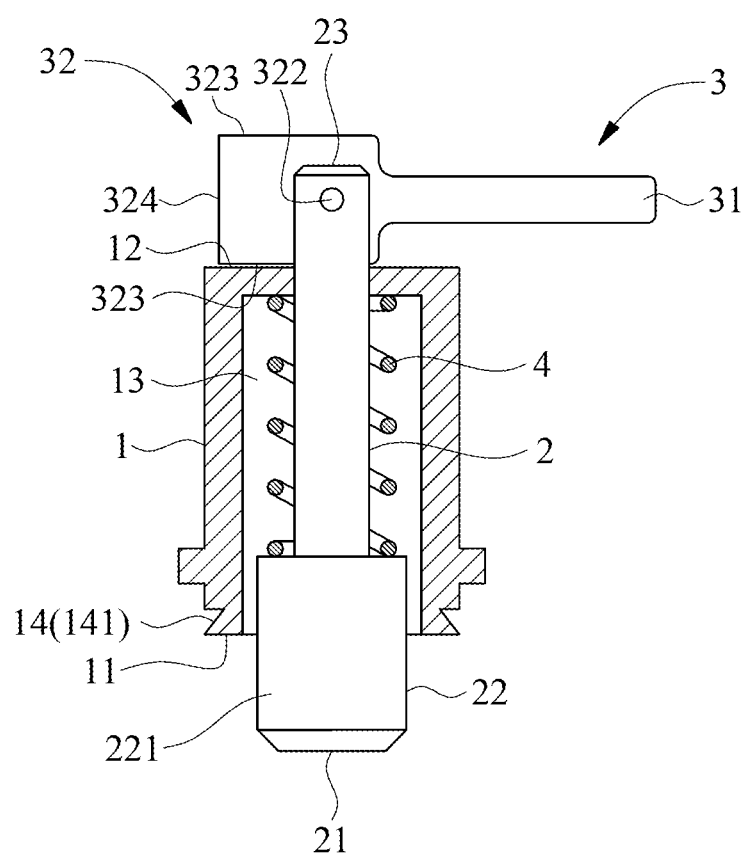
FIG. 1 is an assembled schematic cross-sectional view of the preferred embodiment of the present invention.
Figure 2:
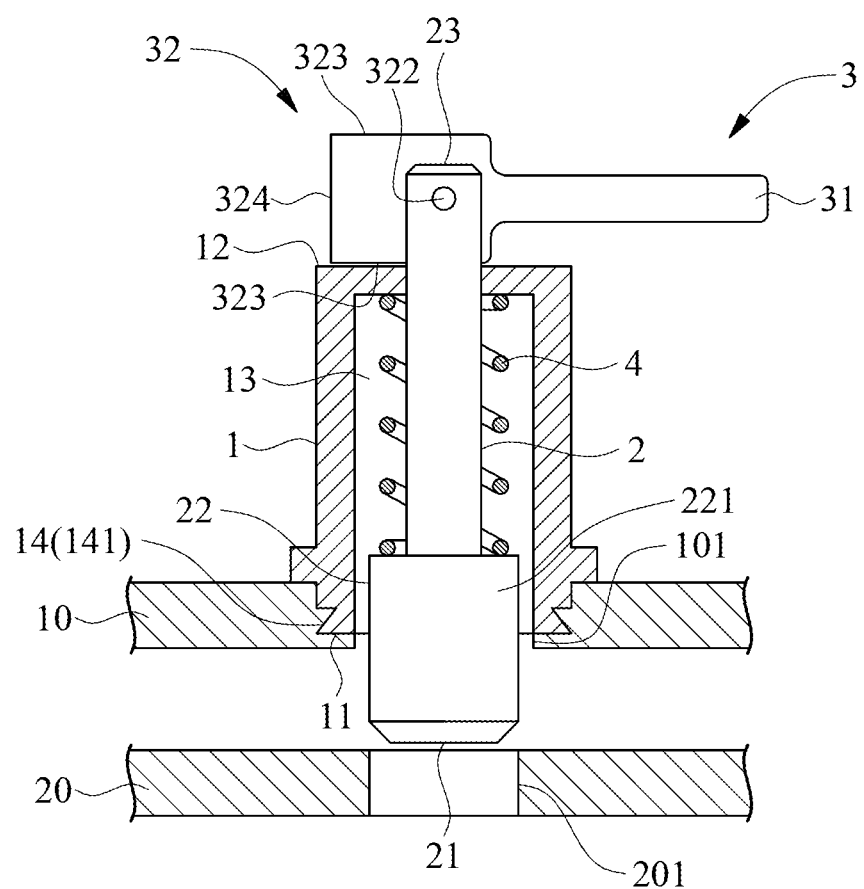
FIG. 2 is a schematic view of the application and operation of the preferred embodiment of the present invention.
Figure 3:
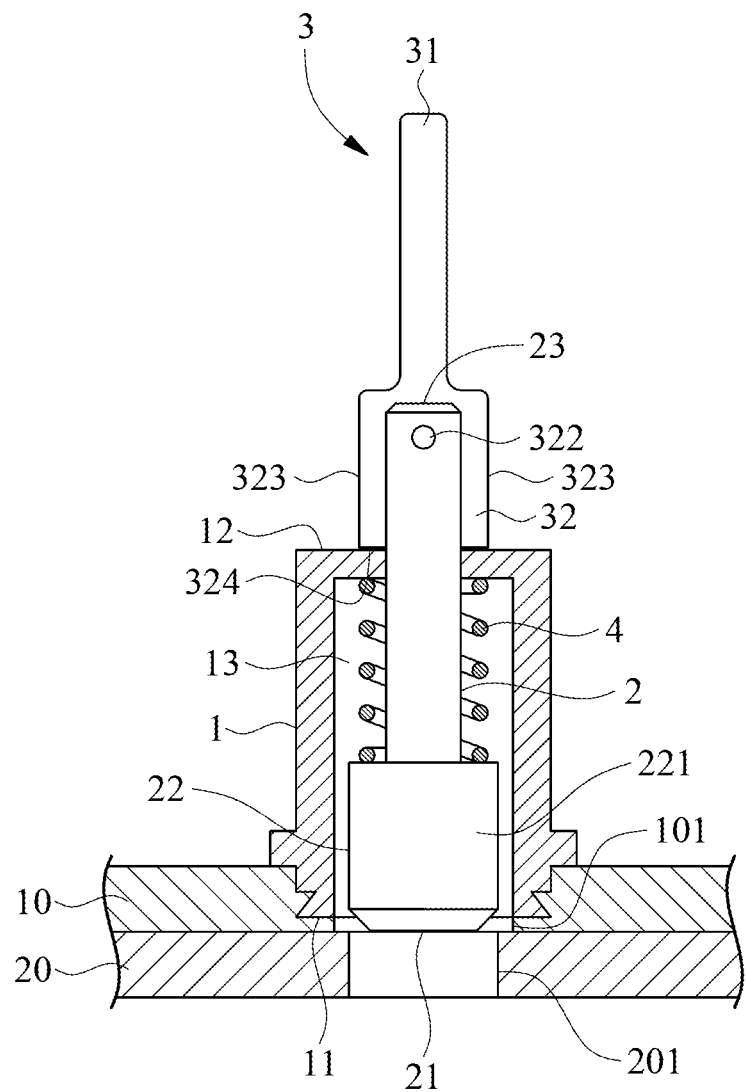
FIG. 3 is another schematic view of the application and operation of the preferred embodiment of the present invention.

FIGS. 1, 2 and 3 show schematic diagrams of a wrench quick release apparatus according to an embodiment of the present invention. The wrench quick release apparatus is first engaged to a first plate 10 at d then engaged to a second plate 20, so as to assemble the first plate 10 with the second plate 20. The wrench quick release apparatus according to a preferred embodiment of the present invention comprises a sleeve 1, a positioning unit 2, a wrench unit 3, and an elasticity unit 4. The sleeve 1 comprises a first end 11, a second end 12 opposite to the first end 11, a channel 13 in communication with the first end 11 and the second end 12, and an engaging section 14 at the first end 11 for engaging to the first plate 10. The positioning unit 2, being a column body movably inserted in the channel 13 of the sleeve 1, comprises a positioning end 21 protruding to the first end 11 of the sleeve 1, a positioning section 22 provided at the positioning end 21 and for engaging the second plate 20, and an activating end 23 opposite to the positioning end 21 and protruding out from the second end 12 of the sleeve 1. The wrench unit 3 comprises a wrench section 31 and a pushing section 32 connected to an end of the wrench section 31. The pushing section 32, which may be shaped as an eccentric cam, an elliptic body, a column body or other equivalent shapes, is movably and pivotally connected to one side of the activating end 23 of the positioning unit 2, such that when the wrench unit 3 is substantially rotated by 90 degrees to push the pushing section 32 against the second end 12 of the sleeve 1, the positioning end 21 and the positioning section 22 of the positioning unit 2 are given impetus for protrusion or retreat for engaging with or disengaging from the second plate 20. The elasticity unit 4, being a screw spring or an elastic unit of other forms fitting around the positioning unit 2, has its one end pushing against the positioning unit 2 and its another end pushing against the sleeve 1, so as to provide impetus to the positioning section 22 of the positioning unit 2 to further engage with the second plate 20. Furthermore, the elasticity of the elasticity unit 4 enables the wrench unit 3 to be positioned at a specific angle.

Referring to FIG. 1, FIG. 2 and FIG. 3, regarding the wrench quick release apparatus of the present invention, a second end 12 of the sleeve 1 is flat, the pushing section 32 has two first contact surfaces 323 and a second contact surface 324, a first contact surface 323 and the second contact surface 324 are flat. The second contact surface 324 is connected between the first contact surfaces 323. The first contact surfaces 323 are two lateral surfaces of the pushing section 32, respectively. The second contact surface 324 is an end surface of the pushing section 32. The first contact surfaces 323 are substantially perpendicular to the second contact surface 324. The vertical distance from a point of pivotal connection of the pushing section 32 and the activating end 23 to the first contact surfaces 323 does not equal the vertical distance from the point of pivotal connection to the second contact surface 324. The first contact surfaces 323 and the second contact surface 324 are movably pushed against the second end 12 of the sleeve 1. Referring to FIG. 1 and FIG. 2, the positioning section 22 initially protrudes from the first end 11 of the sleeve 1. The vertical distance from the point of pivotal connection to the first contact surfaces 323 is less than the vertical distance from the point of pivotal connection to the second contact surface 324. When the wrench unit 3 substantially rotates anticlockwise by 90 degrees, the pushing section 32 is pushed against the second end 12 of the sleeve 1, thereby driving the positioning section 22 of the positioning unit 2 to retreat to the first end 11 of the sleeve 1 (as shown in FIG. 3). When the wrench unit 3 rotates anticlockwise by 90 degrees again or rotates clockwise by 90 degrees again, the pushing section 32 is pushed against the second end 12 of the sleeve 1, thereby driving the positioning section 22 of the positioning unit 2 to protrude from the first end 11 of the sleeve 1 again. In the situation where the positioning section 22 initially retreats to the first end 11 of the sleeve 1, and the vertical distance from the point of pivotal connection to the first contact surfaces 323 is larger than the vertical distance from the point of pivotal connection to the second contact surface 324, the wrench unit 3 substantially rotates anticlockwise by 90 degrees to push the pushing section 32 against the second end 12 of the sleeve 1 and thus drive the positioning section 22 of the positioning unit 2 to protrude from the first end 11 of the sleeve 1. The wrench unit 3 rotates anticlockwise by 90 degrees again or rotates clockwise by 90 degrees again to push the pushing section 32 against the second end 12 of the sleeve 1 and thus drive the positioning section 22 of the positioning unit 2 to retreat to the first end 11 of the sleeve 1.

Figure 4:
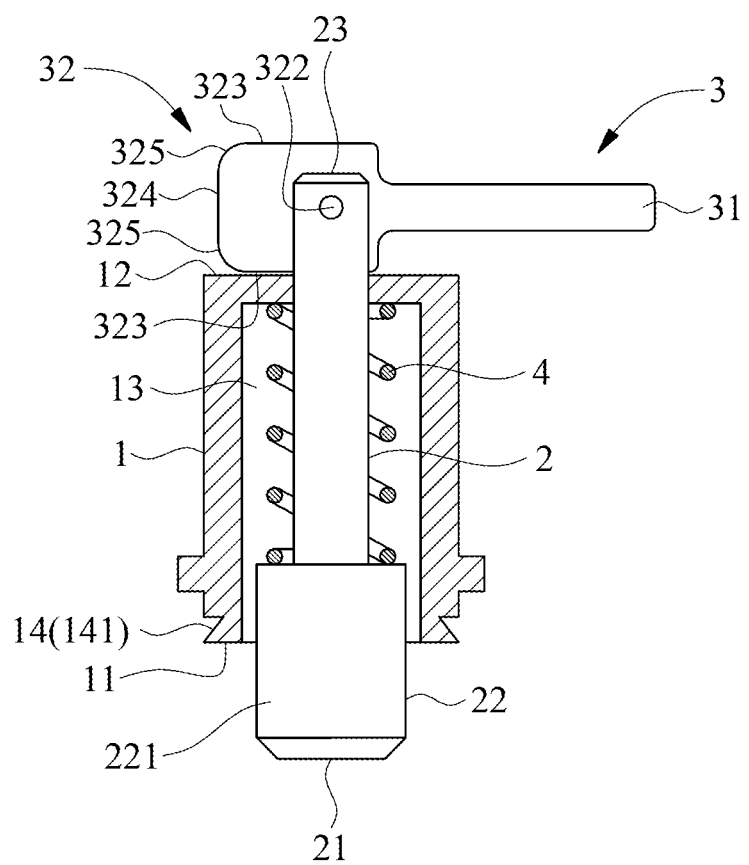
FIG. 4 is a schematic view of a curved surface of the preferred embodiment of the present invention.
Figure 5:
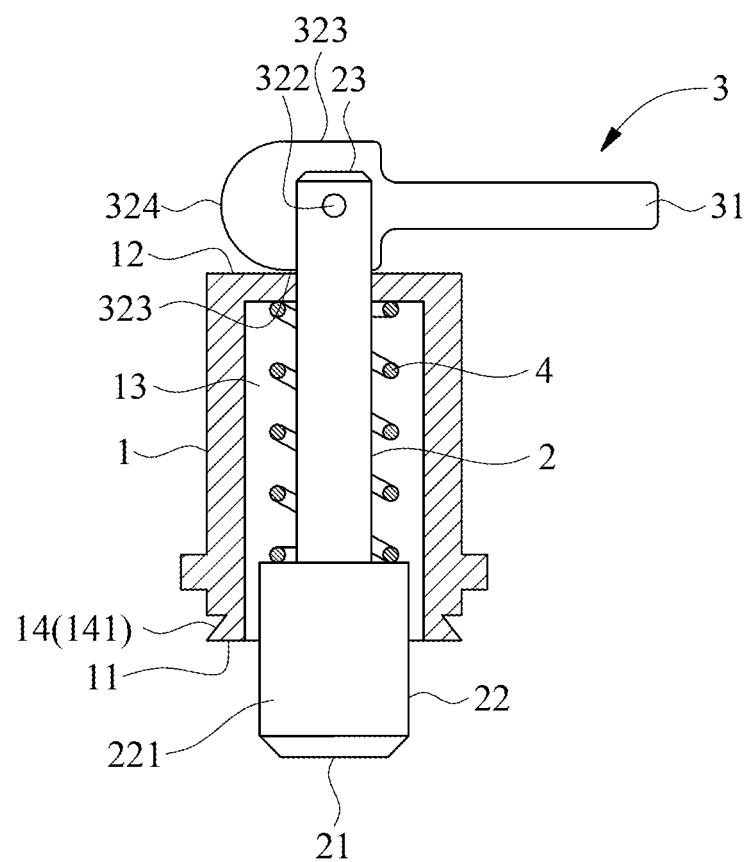
FIG. 5 is a schematic view of a second contact surface provided in the form of a curved surface according to the preferred embodiment of the present invention.

Referring to FIG. 4 and FIG. 5, regarding the wrench quick release apparatus of the present invention, the second contact surface 324 connects to the first contact surfaces 323 by a curved surface 325, respectively, wherein the second contact surface 324 is a curved surface. Thanks to the smoothness of the curved surface, users rotate the wrench unit 3 in a labor-saving manner.

Figure 6:
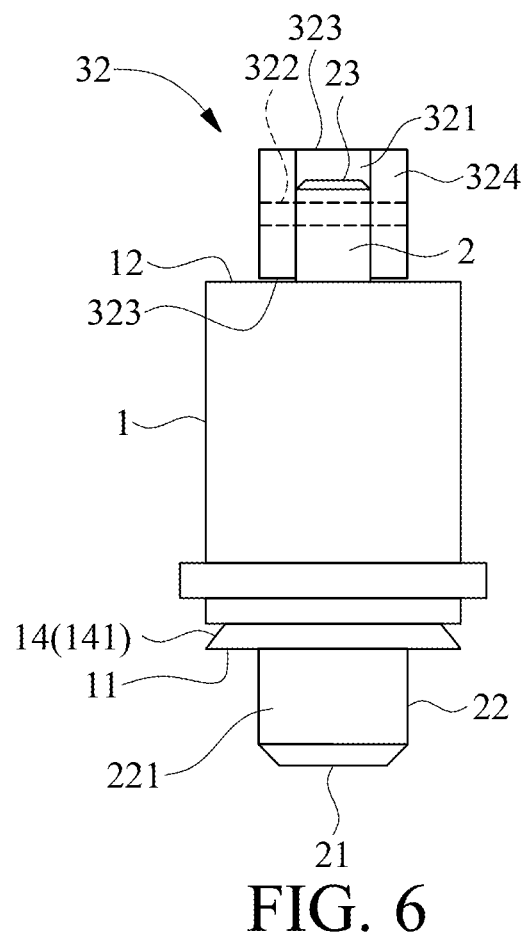
FIG. 6 is a schematic view of a pivot groove of the preferred embodiment of the present invention.
Figure 7:
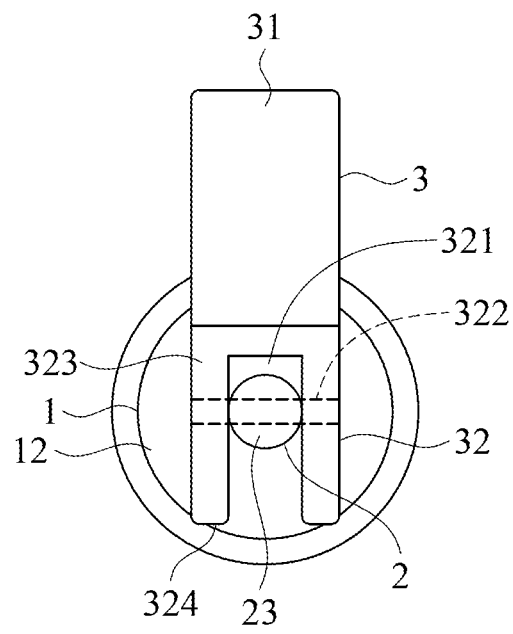
FIG. 7 is a top view of FIG. 6.
Figure 8:
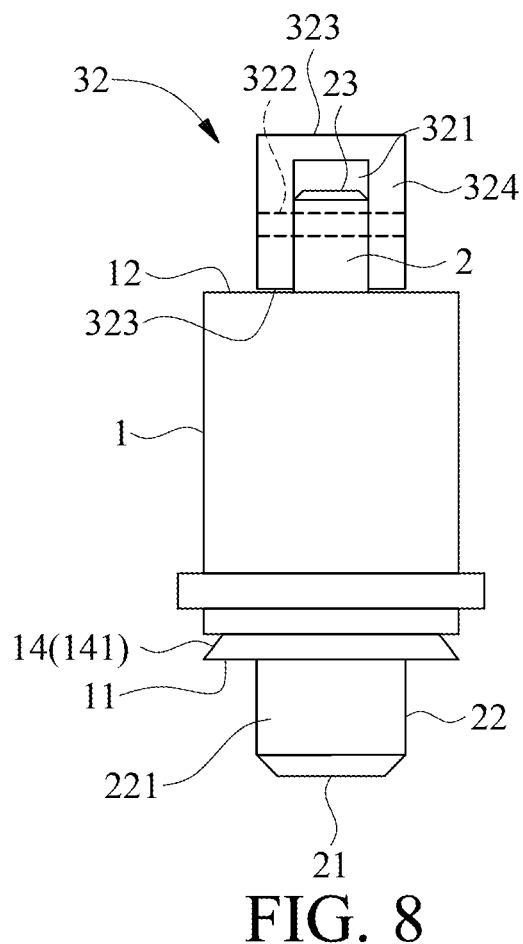
FIG. 8 is another schematic view of the pivot groove of the preferred embodiment of the present invention.
Figure 9:
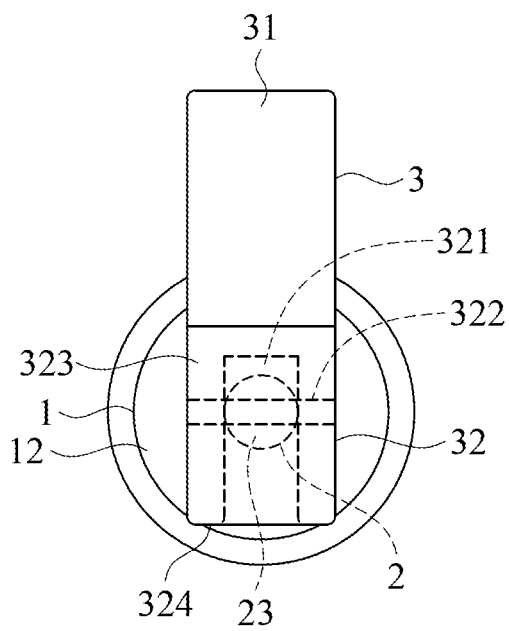
FIG. 9 is a top view of FIG. 8.

Referring to FIG. 6 through FIG. 9, the pushing section 32 of the wrench unit 3 comprises a pivot groove 321 at its center and a pivot 322 (bolt) inserted through the pivot groove 321. Referring to FIG. 6 and FIG. 7, the pivot groove 321 is concavely disposed on the first contact surfaces 323 and the second contact surface 324. Referring to FIG. 8 and FIG. 9, the pivot groove 321 is concavely disposed on one of the first contact surfaces 323 (FIG. 8 and FIG. 9 show that the pivot groove 321 is concavely disposed on the lower one of the first contact surfaces 323) and the second contact surface 324. Thus, the pivot groove 321 is fitted around the activating end 23 of the positioning unit 2, and the pivot 322 is also inserted through the activating end 23 of the positioning unit 2, such that the pushing section 32 of the wrench unit 3 is movably and pivotally connected to the activating end 23 of the positioning unit 2. As a result, when the wrench unit 3 is rotated to push the pushing section 32 against the second end 12 of the sleeve 1, the positioning unit 2 retreats and protrudes. Referring to FIG. 6 and FIG. 7, if the pivot groove 321 is concavely disposed on the first contact surfaces 323 and the second contact surface 324, the wrench unit 3 can be freely rotated by 180 degrees or less. Referring to FIG. 8 and FIG. 9, if the pivot groove 321 is concavely disposed on the lower one of the first contact surfaces 323 and the second contact surface 324, the upper one of the first contact surfaces 323 will function as a stopping surface such that, after the wrench unit 3 has been rotated by 90 degrees from the horizontal plane to the vertical plane, if the wrench unit 3 is to be further rotated in the previous direction, the first contact surfaces 323 will be stopped by the positioning unit 2, and thus the wrench unit 3 will be freely rotated by 90 degrees or less.

Referring to FIG. 2, to apply the wrench quick release apparatus of the present invention, the engaging section 14 of the sleeve 1 is first engaged by riveting, for example, to a first connecting opening 101 of the first plate 10. Referring to FIG. 3, as the wrench section 31 of the wrench unit 3 is rotated, the pushing section 32 is substantially rotated anticlockwise by 90 degrees to push against the second end 12 of the sleeve 1 to further inwardly draw the positioning end 21 and the positioning section 22 of the positioning unit 2 into the sleeve 1. Afterward, when a second connecting opening 201 of the second plate 20 is aligned with the first connecting opening 101 of the first plate 10, the wrench section 31 of the wrench unit 3 is again rotated, so as to substantially rotate the pushing section 32 clockwise (or anticlockwise) by 90 degrees, such that the pushing section 32 is pushed against the second end 12 of the sleeve 1. Accordingly, elastic forces of elasticity unit 4 are applied to the positioning unit 2 to engage (i.e., by inserting) the positioning section 22 at the positioning end 21 to the second connecting opening 201 of the second plate 20, thereby quickly assembling the first plate 10 with the second plate 20. Furthermore, the wrench section 31 of the wrench unit 3 is capable of optimizing applied forces to achieve reduced-effort operations when driving the positioning unit 2. In addition, the quick assembly can be completed without any extra tools when applying the wrench quick release apparatus for assembling the first plate 10 and the second plate 20 to again enhance utilization convenience of the present invention.

Figure 10:
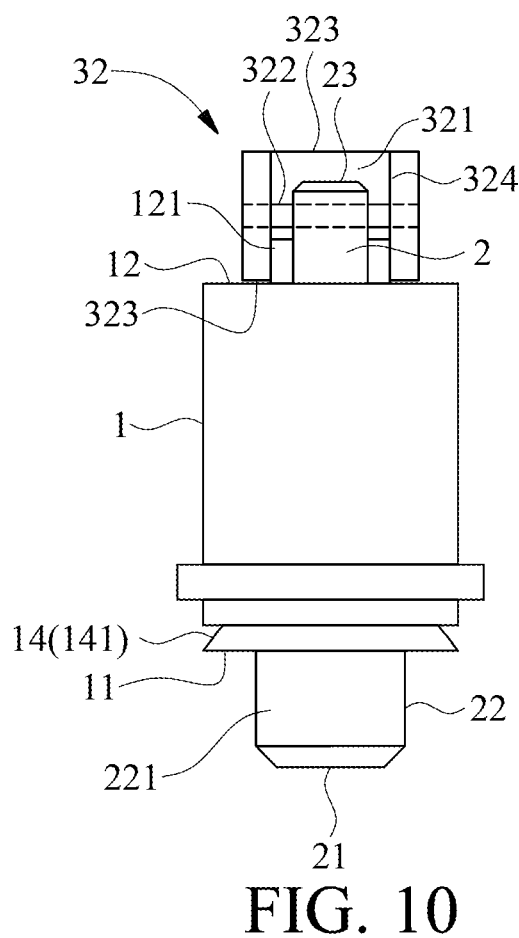
FIG. 10 is a schematic view of a directional protruding section of the preferred embodiment of the present invention.
Figure 11:
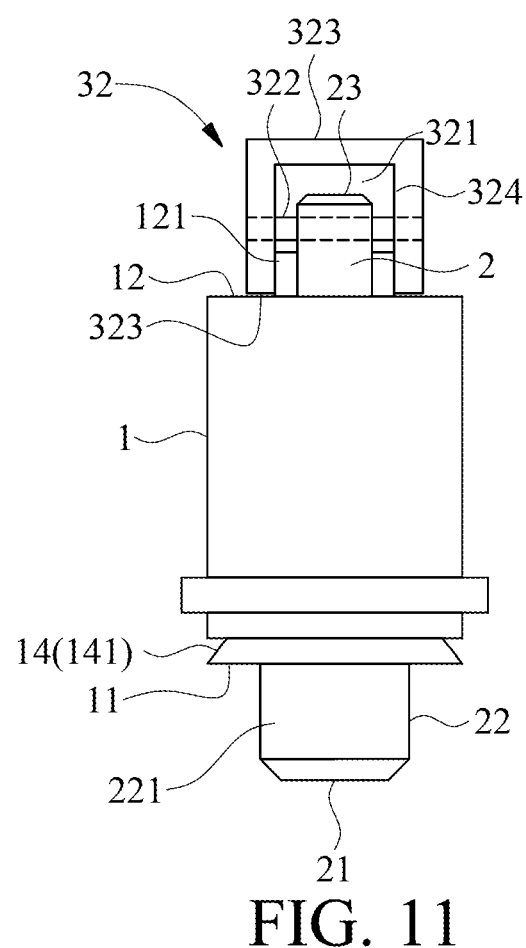
FIG. 11 is another schematic view of the directional protruding section of the preferred embodiment of the present invention.

Referring to FIG. 10 and FIG. 11, the second end 12 of the sleeve 1 has a directional protruding section 121. The directional protruding section 121 is a rectangular parallelepiped or a cube. The activating end 23 of the positioning unit 2 penetrates and exits the directional protruding section 121. The pivot groove 321 movably straddles the directional protruding section 121. With the pivot groove 321 being guided by the directional protruding section 121, the wrench unit 3 is prevented from rotating about the positioning unit 2 when wrenched, thereby enhancing ease of use.

Figure 12:
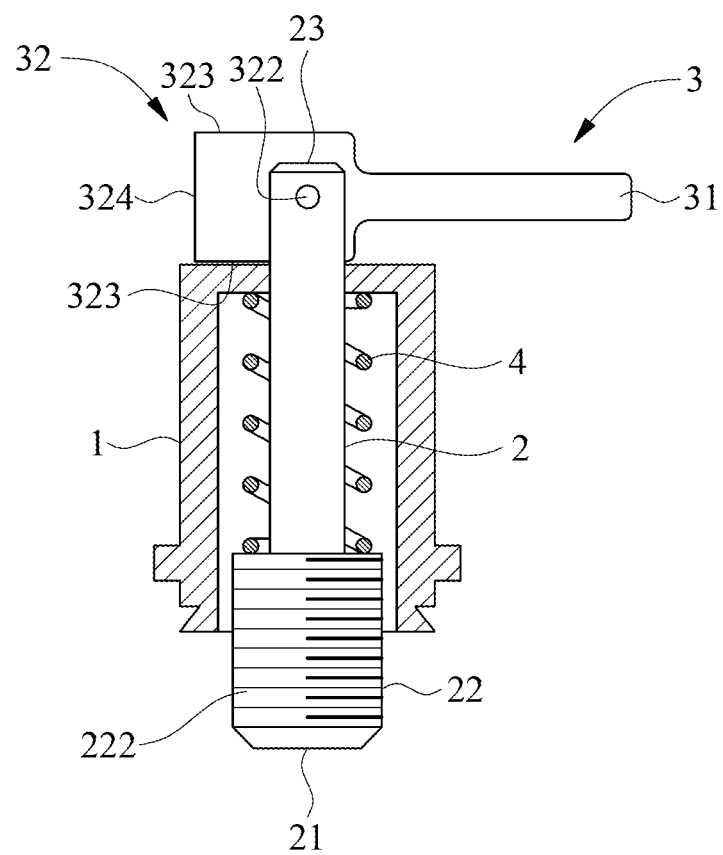
FIG. 12 is a schematic view of a threaded column of the preferred embodiment of the present invention.
Figure 13:
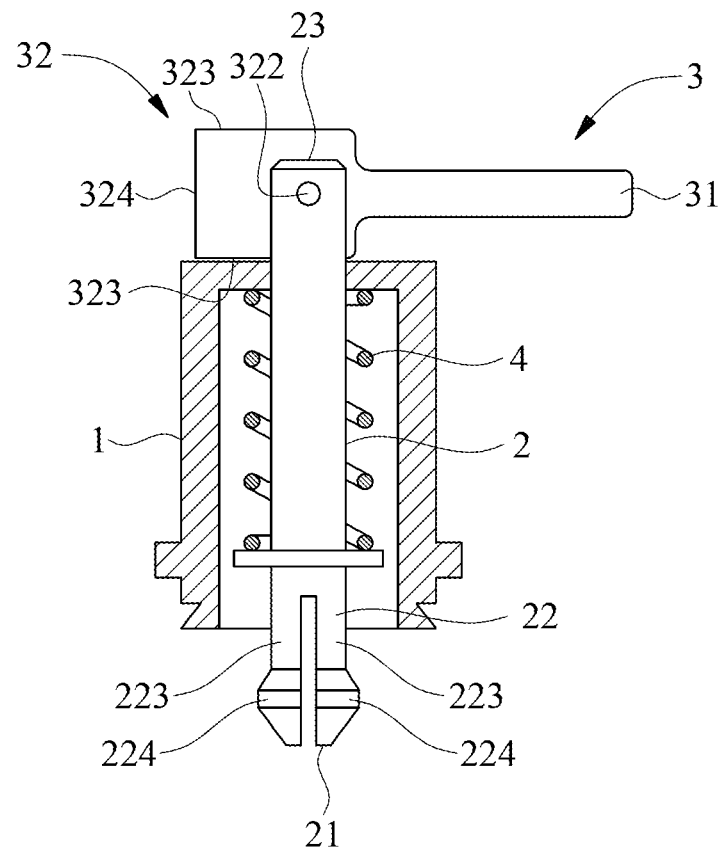
FIG. 13 is a schematic view of an elastic fastening bodies and protruding fastening section of the preferred embodiment of the present invention.
Figure 14:
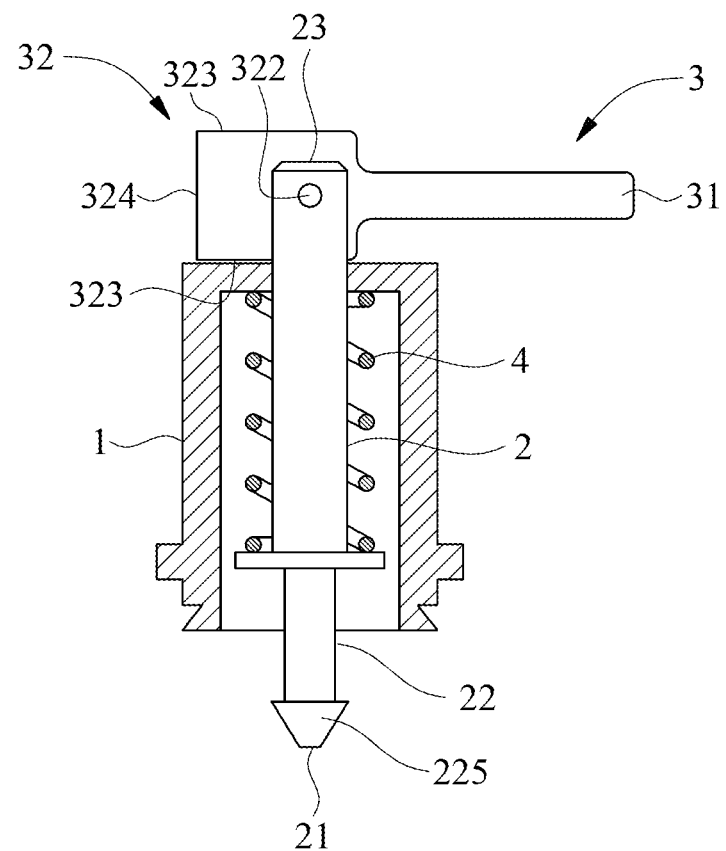
FIG. 14 is a schematic view of a hook of the preferred embodiment of the present invention.

Referring to FIG. 1 through FIG. 3, the positioning section 22 of the positioning unit 2 may comprise a positioning column 221 for inserting into the second opening 201 of the second plate 20 to achieve positioning and assembly effects. Alternatively, as shown in FIG. 12, the positioning section 22 of the positioning unit 2 may also comprise a threaded column 222 for fastening to the second plate, so that the positioning section 22 drives not only the positioning unit 2 for retreat and protrusion through the wrench unit 3 but also the threaded column 222 for fastening to the second connecting opening (e.g., a screw opening) of the second plate. For another example shown in FIG. 13, the positioning section 22 of the positioning unit 2 may comprise at least two elastic fastening bodies 223 each comprising at its one side a protruding fastening section 224 for fastening to the second plate. Thus, when driven by the elasticity unit 4 or the wrench unit 3, the positioning unit 2 gets fastened to the second plate. For another example shown in FIG. 14, the positioning section 22 of the positioning unit 2 may comprise a hook 225 for fastening the second plate. Similarly, the hook 225 gets fastened to the second plate when driven by the elasticity unit 4 or the wrench unit 3.

Figure 15:
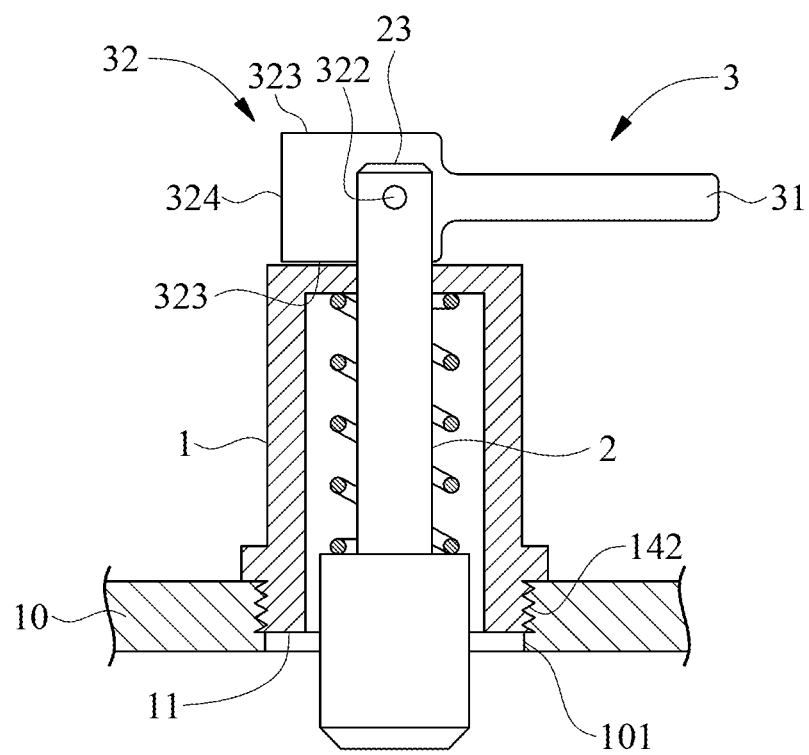
FIG. 15 is a schematic view of an engaging section including a fastening section according to the preferred embodiment of the present invention.
Figure 16:
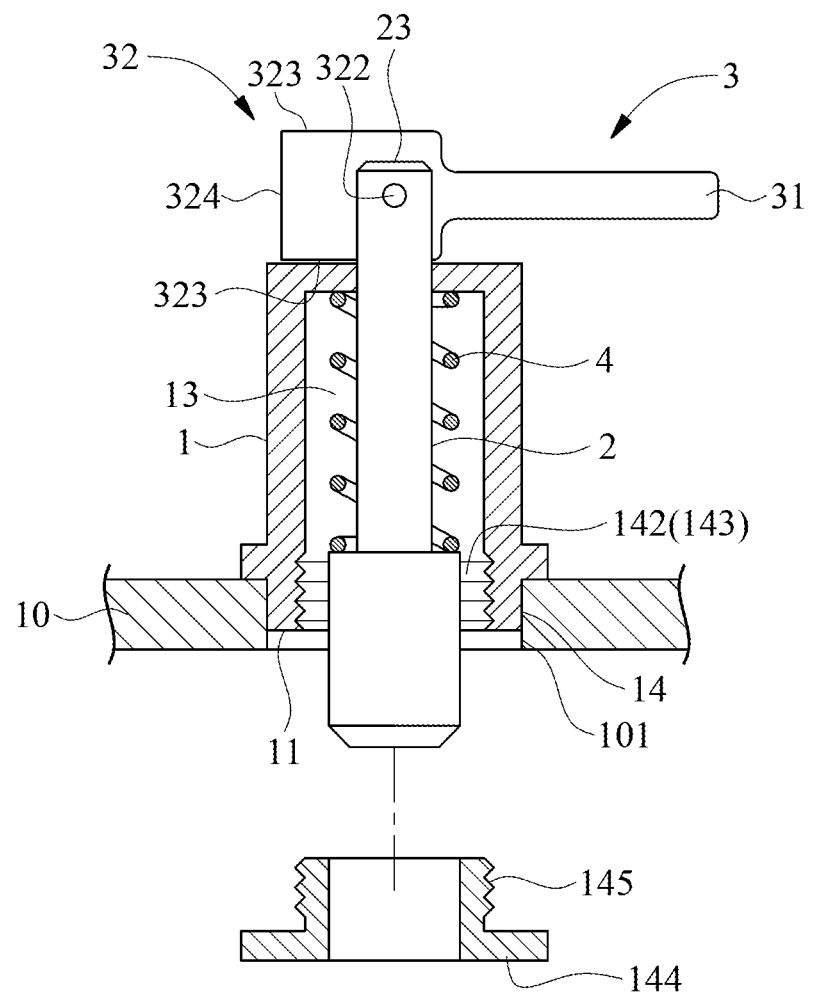
FIG. 16 is another schematic view of the engaging section including a fastening section according to the preferred embodiment of the present invention.
Figure 17:
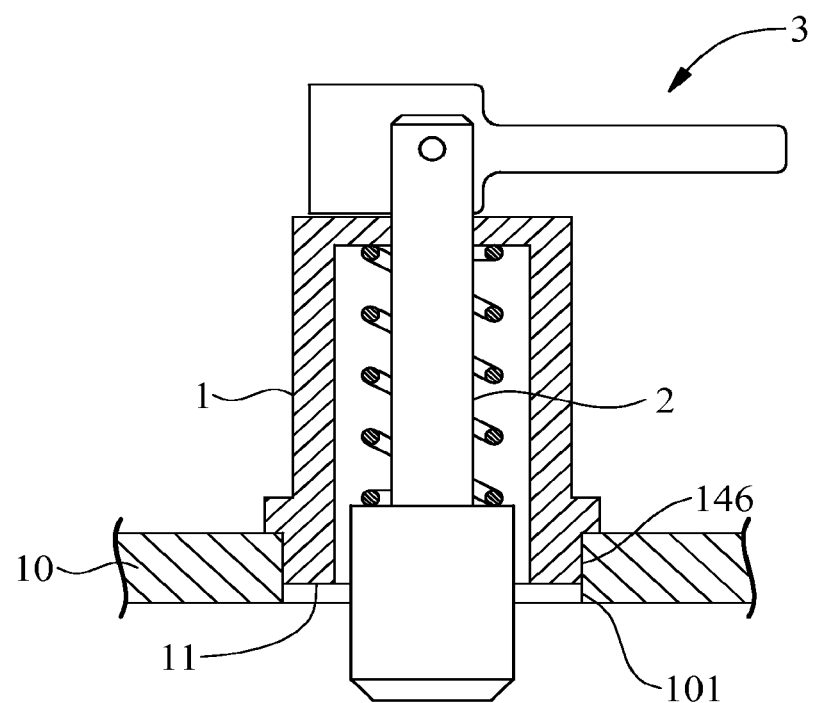
FIG. 17 is a schematic view of an engaging section including a welding section or adhering section according to the preferred embodiment of the present invention.
Figure 18:
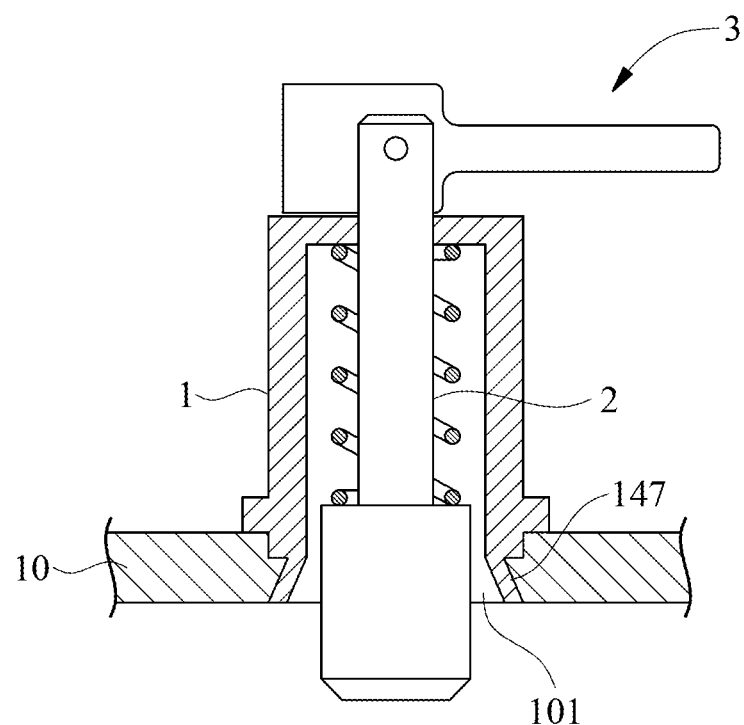
FIG. 18 is a schematic view of an engaging section including a flare-in section according to the preferred embodiment of the present invention.
Figure 19:
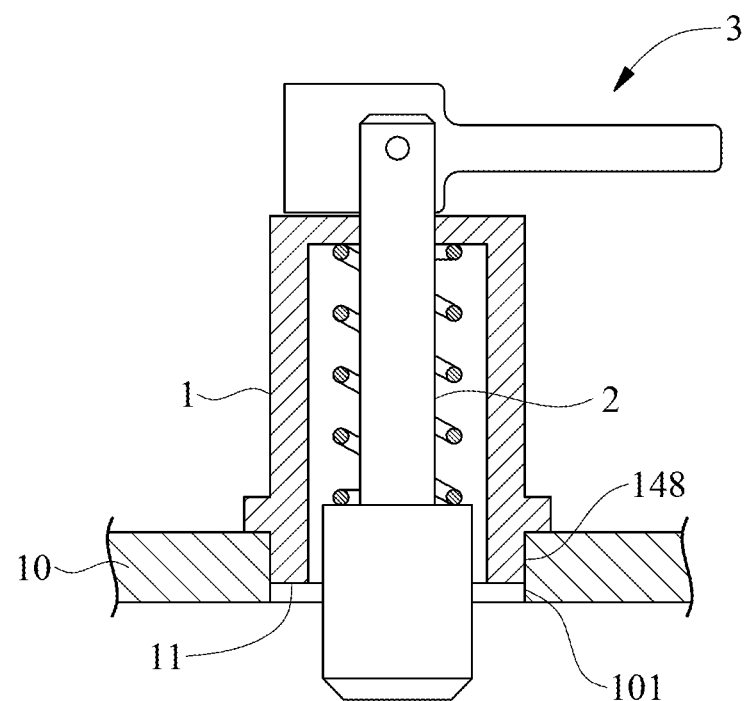
FIG. 19 is a schematic view of an engaging section including a magnetic attraction section according to the preferred embodiment of the present invention.
Figure 20:
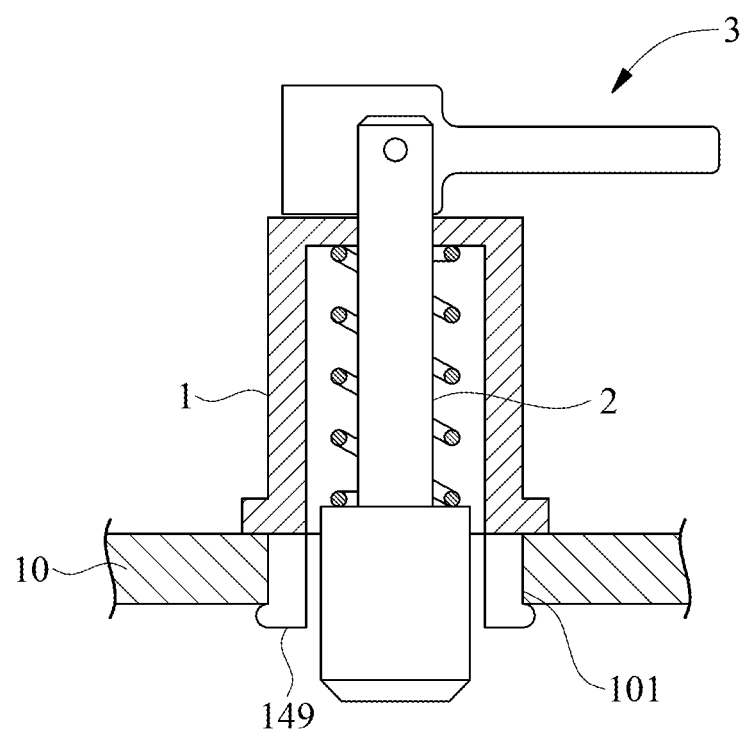
FIG. 20 is a schematic view of an engaging section including a snap-engaging section according to the preferred embodiment of the present invention.

It should be noted that various modifications may be made to the structure of the engaging section 14 of the sleeve 1 for engaging with the first plate 10 without departing from the spirit of the present invention, and that the various modifications are encompassed within the scope of the present invention. For example, referring to FIGS. 2 and 3 showing other embodiments of the present invention, the engaging section 14 of the sleeve 1 may comprise a press-in section 141 for installing to the first plate 10, or a fastening section 142 for fastening to the first plate 10. Referring to FIG. 15, the fastening section 142 may be a screw thread for directly screwing and fastening to the first connecting opening 101 of the first plate 10. Alternatively, as shown in FIG. 16, the fastening section 142 comprises a first screw thread 143 at the channel 13 and a ring-shaped fastening element 144 fastened to the first screw thread 143, and the fastening element 144 is provided with a second screw thread 145 matching the first screw thread 143. Accordingly, the engaging section 14 of the sleeve 1 first accommodates one side of the first plate 10 and the fastening element 144 then fastens the other side of the first plate 10, so as to fasten the second screw thread 145 to the first screw thread 143 located in the channel 13 to further fasten the sleeve 1 to the first connecting opening 101 of the first plate 10, As shown in FIG. 17, in another embodiment of the present invention, the engaging section 14 of the sleeve 1 may comprise a welding section 146 (or adhering section) for welding (or adhering) to the first connecting opening 101 of the first plate 10. Referring to FIG. 18 showing another embodiment of the present invention, the engaging section 14 of the sleeve 1 may comprise a flare-in section 147 for installing to the first connecting opening 101 of the first plate 10. Referring to FIG. 19, the engaging section 14 of the sleeve 1 comprises a magnetic attraction section 148 attracted to the first engaging hole 101 of the first plate 10 magnetized. Referring to FIG. 20, the engaging section 14 of the sleeve 1 comprises a snap-engaging section 149 for snap-engaging with the first engaging hole 101 of the first plate 10.

Figure 21:
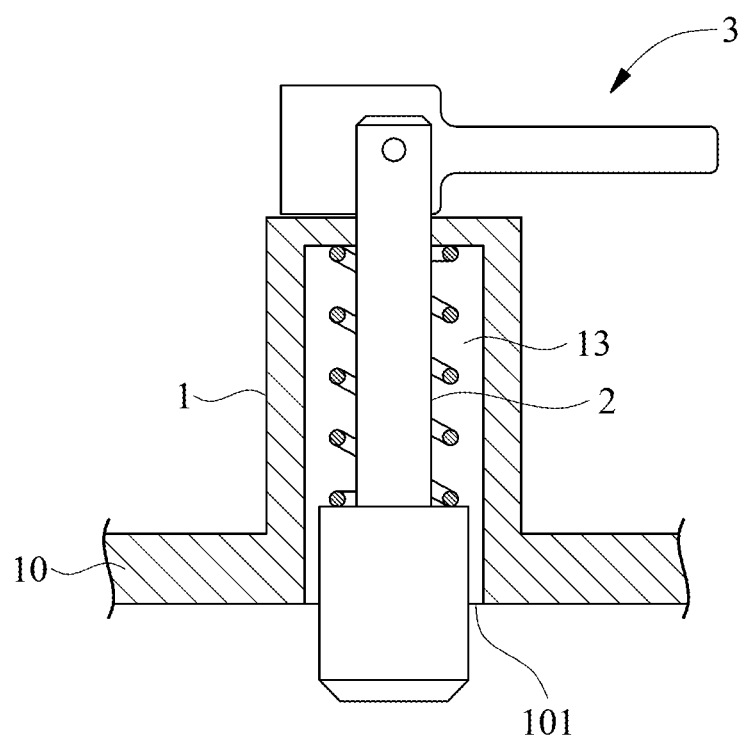
FIG. 21 is a schematic view of an engaging section and a first plate which are integrally formed according to the preferred embodiment of the present invention.

Referring to FIG. 21, the engaging section 14 of the sleeve 1 is integrally formed on the first plate 10 directly, and the channel 13 is in communication with the first engaging hole 101 of the first plate 10, to achieve the same effects.

The present invention further provides another wrench quick release apparatus which comprises a plurality of said wrench quick release apparatuses, for example, two said wrench quick release apparatuses, three said wrench quick release apparatuses, or four said wrench quick release apparatuses, wherein the wrench sections 31 are connected to each other, to not only increase the strength of engagement of the first plate 10 and the second plate 20, but also allow the wrench sections 31 to be wrenched simultaneously and operated easily.

With the above embodiments, it is illustrated that the present invention provides a novel wrench quick release apparatus offering many advantages. Through the combination of the sleeve, the positioning unit, the wrench unit and the elasticity unit, the wrench quick release apparatus of the present invention is first engaged to the first plate through the sleeve and is then engaged to or disengaged from the second plate with the positioning section of the positioning unit through rotations of the wrench unit, so as to quickly and steadily assemble the first plate with the second plate with minimal efforts in a convenient manner.

The present invention is disclosed above by preferred embodiments. However, persons skilled in the art should understand that the preferred embodiments are illustrative of the present invention only, but should not be interpreted as restrictive of the scope of the present invention. Hence, all equivalent variations and replacements made to the aforesaid embodiments should fall within the scope of the present invention. Accordingly, the legal protection for the present invention should be defined by the appended claims.

What is claimed is:

1. A wrench quick release apparatus, for engaging with a first plate and then engaging with a second plate, comprising:
   a sleeve having a first end, a second end opposite to the first end, a channel in communication with the first end and the second end, and an engaging section for engaging to the first plate;
   a positioning unit, being a column body movably inserted in the channel of the sleeve, comprising a positioning end protruding to the first end of the sleeve, a positioning section provided at the positioning end and for engaging to a positioning section of the second plate, and an activating end opposite to the positioning end and protruding out from the second end of the sleeve;
   a wrench unit comprising a wrench section and a pushing section connected to the wrench section, the pushing section being a column body and movably and pivotally connected to the activating end of the positioning unit, such that the wrench unit substantially rotates in two directions, the two directions being clockwise and anti-clockwise, by 90 degrees to push the pushing section against the second end of the sleeve, thereby driving the positioning end and the positioning section of the positioning unit to protrude or retreat; and
   an elasticity unit fitted around the positioning unit, comprising an end pushed against the positioning unit and another end pushed against the sleeve;
   wherein, the second end of the sleeve is flat, the pushing section has two first contact surfaces and a second contact surface, the first contact surfaces and the second contact surface are flat, the second contact surface being connected between the first contact surfaces, the first contact surfaces being two lateral surfaces of the pushing section, respectively, the second contact surface being an end surface of the pushing section, the second contact surface being perpendicular to the first contact surfaces substantially, wherein a vertical distance from a point of pivotal connection of the pushing section and the activating end to the first contact surfaces does not equal a vertical distance from the point of pivotal connection to the second contact surface, wherein the first contact surfaces and the second contact surface are movably pushed against the second end of the sleeve.

2. The wrench quick release apparatus of claim 1, wherein the second contact surface connects to the first contact surfaces by a curved surface, respectively.

3. The wrench quick release apparatus of claim 1, wherein the pushing section of the wrench unit comprises a pivot groove and a pivot inserted through the pivot groove, and the pivot groove is concavely disposed on the first contact surfaces and the second contact surface or concavely disposed on one of the first contact surfaces and the second contact surface, wherein the pivot groove is fitted around the activating end of the positioning unit, and the pivot is inserted through the activating end of the positioning unit.

4. The wrench quick release apparatus of claim 3, wherein the second end of the sleeve has a directional protruding section, such that the activating end of the positioning unit penetrates and exits the directional protruding section, and the pivot groove movably straddles the directional protruding section.

5. The wrench quick release apparatus of claim 1, wherein the positioning section of the positioning unit comprises a positioning column body for inserting through the second plate, a threaded column for fastening to the second plate, at least two elastic fastening bodies each comprising at its one side a protruding fastening section for fastening to the second plate, or a hook for fastening the second plate.

6. The wrench quick release apparatus of claim 1, wherein the engaging section is one of a rivet section, a fastening section, a welding section, a flare-in section, an adhering section, a magnetic attraction section, and a snap-engaging section.

7. The wrench quick release apparatus of claim 1, wherein the engaging section is a fastening section, the fastening section comprises a first screw thread at the channel and a fastening element fastened to the first screw thread, and the fastening element comprises a second screw thread matching the first screw thread; the engaging section of the sleeve first for accommodating one side of the first plate and the fastening element then for fastening another side of the first plate to fasten the second screw thread to the first screw thread.

8. The wrench quick release apparatus of claim 1, wherein the engaging section is for engaging the first plate, and the channel is in communication with a first engaging hole of the first plate.

9. A wrench quick release apparatus, for engaging with a first plate and then engaging with a second plate, comprising:
a sleeve having a first end, a second end opposite to the first end, a channel in communication with the first end and the second end, and an engaging section for engaging to the first plate;
a positioning unit, being a column body movably inserted in the channel of the sleeve, comprising a positioning end protruding to the first end of the sleeve, a positioning section provided at the positioning end and for engaging to a positioning section of the second plate, and an activating end opposite to the positioning end and protruding out from the second end of the sleeve;
a wrench unit comprising a wrench section and a pushing section connected to the wrench section, the pushing section being a column body and movably and pivotally connected to the activating end of the positioning unit, such that the wrench unit substantially rotates by 90 degrees to push the pushing section against the second end of the sleeve, thereby driving the positioning end and the positioning section of the positioning unit to protrude or retreat; and
an elasticity unit fitted around the positioning unit, comprising an end pushed against the positioning unit and another end pushed against the sleeve;
wherein, the second end of the sleeve is flat, the pushing section has two first contact surfaces and a second contact surface, the first contact surfaces and the second contact surface are flat, the second contact surface being connected between the first contact surfaces, the first contact surfaces being two lateral surfaces of the pushing section, respectively, the second contact surface being an end surface of the pushing section, the second contact surface being perpendicular to the first contact surfaces substantially, wherein a vertical distance from a point of pivotal connection of the pushing section and the activating end to the first contact surfaces does not equal a vertical distance from the point of pivotal connection to the second contact surface, wherein the first contact surfaces and the second contact surface are movably pushed against the second end of the sleeve;
wherein the engaging section is a fastening section, the fastening section comprises a first screw thread at the channel and a fastening element fastened to the first screw thread, and the fastening element comprises a second screw thread matching the first screw thread; engaging section of the sleeve first for accommodating one side of the first plate and the fastening element then for fastening another side of the first plate to fasten the second screw thread to the first screw thread.

* * * * *